US009641005B2

(12) United States Patent
Tsuchiya et al.

(10) Patent No.: US 9,641,005 B2
(45) Date of Patent: May 2, 2017

(54) ELECTRIC POWER SUPPLY SYSTEM

(71) Applicant: DENSO CORPORATION, Kariya, Aichi-pref. (JP)

(72) Inventors: Shizuo Tsuchiya, Gifu (JP); Atsushi Mise, Nagoya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 159 days.

(21) Appl. No.: 14/736,442

(22) Filed: Jun. 11, 2015

(65) Prior Publication Data

US 2015/0372511 A1 Dec. 24, 2015

(30) Foreign Application Priority Data

Jun. 12, 2014 (JP) ................................ 2014-121473

(51) Int. Cl.
*H02J 7/00* (2006.01)
*H02J 9/06* (2006.01)
*H02J 7/35* (2006.01)

(52) U.S. Cl.
CPC .......... *H02J 7/0021* (2013.01); *H02J 7/0065* (2013.01); *H02J 9/061* (2013.01); *H02J 7/35* (2013.01); *Y02B 10/72* (2013.01); *Y02B 90/14* (2013.01)

(58) Field of Classification Search
CPC ........ H02J 7/0021; H02J 7/007; H02J 7/0065; H02J 7/35
USPC .......................................................... 320/128
See application file for complete search history.

(56) References Cited

U.S. PATENT DOCUMENTS 6,680,600 B2 * 1/2004 Emori .................. B60L 11/185 307/10.1
9,168,841 B2 * 10/2015 Kawai ................ B60L 11/1824
2010/0251692 A1 * 10/2010 Kinde, Sr. .............. F02K 5/026 60/226.1

(Continued)

FOREIGN PATENT DOCUMENTS

JP 2009-213228 9/2009
JP 2010273519 A 12/2010
JP 2013-106372 5/2013

(Continued)

*Primary Examiner* — M'Baye Diao
(74) *Attorney, Agent, or Firm* — Harness, Dickey & Pierce, P.L.C.

(57) ABSTRACT

An electric power supply system is provided. The electric power supply system includes charge and discharge devices capable of performing a system interconnection to charge and discharge a power system. At least one of the charge and discharge devices is capable of performing a simulated system operation of supplying electric power of constant power and constant frequency to the power system when an abnormality occurs in a commercial power supply. According to a check result on a state of charge of an electricity storage, electric power supplied from a distributed power supply, and consumption power in a load, the electric power supply system can simultaneously charge or discharge electricity storages of the charge and discharge devices, and preferentially charges the electricity storage of the charge and discharge device performing the simulated system operation, and preferentially discharges the electricity storage of the charge and discharge device performing the system interconnection.

5 Claims, 11 Drawing Sheets

1
70 CONTROL UNIT
INTERCONNECTION RELAY
STAND-ALONE RELAY
INTERCONNECTION RELAY
STAND-ALONE RELAY
40
90
10 SOLAR CELL SYSTEM
11 PV
12 PCS
20 FUEL CELL SYSTEM
21 FC
22 PCS
30 1ST CHARGE DISCHARGE DEVICE
31 1ST ELECTRICITY STORAGE
32 1ST CHARGE DISCHARGE PCS
33 34
2ND CHARGE DISCHARGE DEVICE
41 2ND ELECTRICITY STORAGE
42 2ND CHARGE DISCHARGE PCS
43 44
LOAD
80 61 MONITOR 60 a b c
62 MONITOR
63 MONITOR
64 MONITOR
87 86 85

(56) References Cited

U.S. PATENT DOCUMENTS

2011/0130907 A1* 6/2011 Gau .................... B60W 10/26
701/22
2013/0300374 A1 11/2013 Tomita et al.

FOREIGN PATENT DOCUMENTS

JP 2013-162686 8/2013
JP 2013-247795 12/2013

* cited by examiner 1
70
CONTROL UNIT
INTERCONNECTION RELAY
STAND-ALONE RELAY
INTERCONNECTION RELAY
STAND-ALONE RELAY
90
LOAD
40
2ND CHARGE DISCHARGE DEVICE
2ND ELECTRICITY STORAGE
2ND CHARGE DISCHARGE PCS
41
42
43
44
30
1ST CHARGE DISCHARGE DEVICE
1ST ELECTRICITY STORAGE
1ST CHARGE DISCHARGE PCS
31
32
33
34
20
FUEL CELL SYSTEM
FC
PCS
21
22
10
SOLAR CELL SYSTEM
PV
PCS
11
12
MONITOR
61
62
63
64
60
a
b
c
80
85
86
87

FIG. 2

| STATE | SOC | | CHARGE DISCHARGE OPERATION (◎:POSSIBLE AND PREFERENTIAL, ○:POSSIBLE, ×:IMPOSSIBLE) | | | |
|---|---|---|---|---|---|---|
| | MASTER DEVICE | SLAVE DEVICE | MASTER DEVICE | | SLAVE DEVICE | |
| | | | CHARGING | DIS-CHARGING | CHARGING | DIS-CHARGING |
| A | 0 ≤ SOC ≤ LOWER LIMIT L1 | SOC ≥ UPPER LIMIT H2 | ○ | × | × | ○ |
| B | | LOWER LIMIT L2 < SOC < UPPER LIMIT H2 | ◎ | × | ○ | ○ |
| C | | SOC = LOWER LIMIT L2 | ◎ | × | ○ | × |
| D | LOWER LIMIT L1 < SOC < UPPER LIMIT H1 | SOC ≥ UPPER LIMIT H2 | ○ | ○ | × | ◎ |
| E | | LOWER LIMIT L2 < SOC < UPPER LIMIT H2 | ◎ | ○ | ○ | ◎ |
| F | | SOC = LOWER LIMIT L2 | ◎ | ○ | ○ | × |
| G | SOC ≥ UPPER LIMIT H1 | SOC ≥ UPPER LIMIT H2 | × | ◎ | × | ○ |
| H | | LOWER LIMIT L2 < SOC < UPPER LIMIT H2 | × | ◎ | ○ | ○ |
| I | | SOC = LOWER LIMIT L2 | × | ○ | ○ | × |

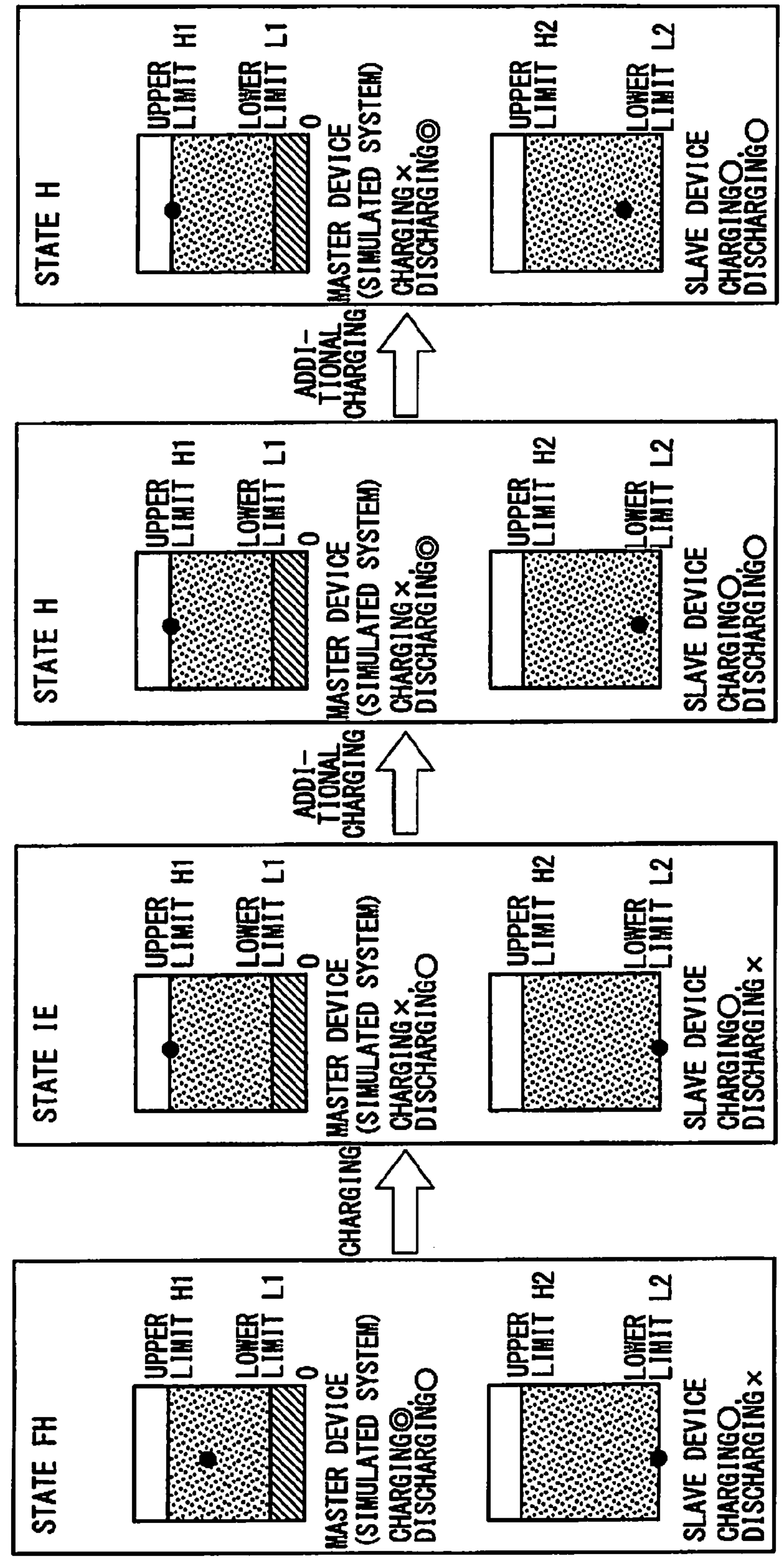
FIG. 4
STATE FH
UPPER LIMIT H1
LOWER LIMIT L1
0
MASTER DEVICE (SIMULATED SYSTEM)
CHARGING◎, DISCHARGING○
UPPER LIMIT H2
LOWER LIMIT L2
SLAVE DEVICE
CHARGING○, DISCHARGING×
CHARGING
STATE IE
UPPER LIMIT H1
LOWER LIMIT L1
0
MASTER DEVICE (SIMULATED SYSTEM)
CHARGING×, DISCHARGING○
UPPER LIMIT H2
LOWER LIMIT L2
SLAVE DEVICE
CHARGING○, DISCHARGING×
ADDI-TIONAL CHARGING
STATE H
UPPER LIMIT H1
LOWER LIMIT L1
0
MASTER DEVICE (SIMULATED SYSTEM)
CHARGING×, DISCHARGING◎
UPPER LIMIT H2
LOWER LIMIT L2
SLAVE DEVICE
CHARGING○, DISCHARGING○
ADDI-TIONAL CHARGING
STATE H
UPPER LIMIT H1
LOWER LIMIT L1
0
MASTER DEVICE (SIMULATED SYSTEM)
CHARGING×, DISCHARGING◎
UPPER LIMIT H2
LOWER LIMIT L2
SLAVE DEVICE
CHARGING○, DISCHARGING○

ELECTRIC POWER SUPPLY SYSTEM

CROSS REFERENCE TO RELATED APPLICATION

This application is based on Japanese Patent Application No. 2014-121473 filed on Jun. 12, 2014, disclosure of which is incorporated herein by reference.

TECHNICAL FIELD

The present disclosure relates to an electric power supply system capable of performing self-sustained operation.

BACKGROUND ART

It is known that a conventional electric power supply system can perform self-sustained operation even when the commercial power supply stops. For example, in patent literature 1, a system includes first and second electricity storage systems, and uses one of the electricity storage systems for charging, and the other electricity storage system for discharging.

Patent Literature 1: JP 2013-162686A

In the patent literature 1, because one of the electricity storage systems is used for charging and the other electricity storage system is used for discharging, the flexibility in charging and discharging is low. In addition, when the remaining charge amount of one of the electricity storage systems becomes equal to or less than a predetermined value, the electricity storage system for charging and the electricity storage system for discharging are exchanged. Consequently, there is the possibility that electric power is shifted uselessly from one of the electricity storage systems to the other electricity storage system.

SUMMARY

The present disclosure is made in view of the foregoing and its object is to provide an electric power supply system capable of stably supplying electric power even when an abnormality occurs in a commercial power supply.

According to an aspect of the present disclosure, an electric power supply system comprises a distributed power supply, a plurality of charge and discharge devices, a switch device and a control unit.

The distributed power supply is capable of supplying electric power to a power system that is also supplied with electric power from a commercial power supply and is capable of supplying electric power to a load.

The charge and discharge device includes a chargeable and dischargeable electricity storage and is capable of performing a system interconnection of performing a charging and discharging operation on the power system. At least one of the plurality of charge and discharge devices is capable of performing a simulated system operation of supplying the electric power with a constant power and a constant frequency to the power system when the abnormality occurs in the commercial power supply.

The switch device connects the commercial power supply to the power system when the commercial power supply is normal, and disconnects the commercial power supply from the power system when the commercial power supply has an abnormality.

The control unit controls the charge and discharge devices and includes a charge state obtaining section, a state checking section, a charge and discharge control section.

The charge state obtaining section obtains states of charge of the electricity storages.

The state checking section performs a state check based on the states of charge of the electricity storages when the abnormality occurs in the commercial power supply, The charge and discharge control section is capable of simultaneously charging and discharging the electricity storages of the plurality of charge and discharge devices in accordance with a check result of the state checking section, the electric power supplied from the distributed power supply, and consumption power in the load. The charge and discharge control section preferentially charges the electricity storage of the charge and discharge device performing the simulated system operation and preferentially discharges the electricity storage of the charge and discharge device performing the system interconnection.

In the electric power supply system, because at least one of the charge and discharge devices can perform the simulated system operation, the electric power can be stably supplied from the electric power supply system to the load even when the abnormality occurs in the commercial power supply.

Furthermore, by controlling the plurality of charge and discharge device in liaison with each other in accordance with the check result of the charge state of the electricity storages, the electric power supplied from the distributed power supply, and the consumption power in the load, it is possible to assure a sufficient charge amount and a sufficient discharge amount.

Furthermore, by preferentially charging, out of the plurality of charge and discharge devices, the electricity storage of the charge and discharge device performing the simulated system operation and preferentially discharging the electricity storage of the charge and discharge device performing the system interconnection other than the charge and discharge device performing the simulated system operation, it is possible to stably continue the simulated system function and it is possible to perform the discharging properly according to the consumption power of the load.

BRIEF DESCRIPTION OF DRAWINGS

The above and other objects, features and advantages of the present disclosure will become more apparent from the following detailed description made with reference to the accompanying drawings. In the accompanying drawings:

FIG. 2 is an explanatory diagram illustrating a state check in the first embodiment;

FIG. 4 is an explanatory diagram illustrating the state check at a charge request time in the first embodiment;

DETAILED DESCRIPTION

Hereinafter, an electric power supply system will be described with reference to the drawings. In embodiments, like references are used to refer to like parts and redundant description may be omitted.

First Embodiment

Figure 1:
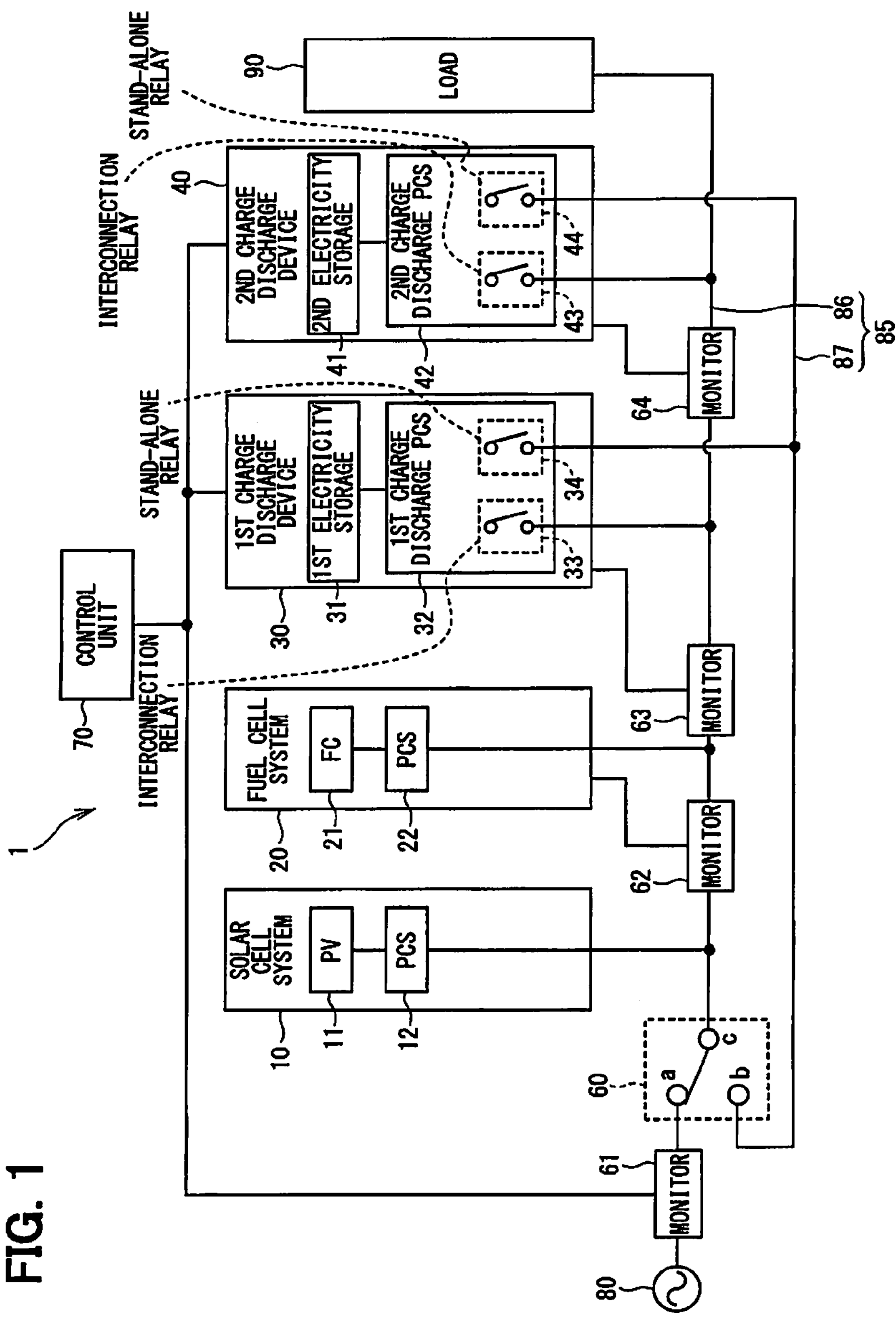
FIG. 1 is a block diagram illustrating a configuration of an electric power supply system according to a first embodiment.

As illustrated in FIG. 1, an electric power supply system 1 according to a first embodiment is configured so that electric power is supplied from a commercial power source 80 and electric power can be supplied to a load 90. In the embodiment, a power system 85 includes a first line 86 and a second line 87. A solar cell system 10, a fuel cell system 20, interconnection relays 33 and 43, and the load 90 which will be described later are connected to the first line 86. Stand-alone relays 34 and 44 are connected to the second line 87.

The electric power supply system 1 includes the solar cell system 10, the fuel cell system 20, a first charge and discharge device 30, a second charge and discharge device 40, a switch unit 60, monitors 61 to 64, a control unit 70, and the like.

The solar cell system 10, which is a distributed power supply capable of performing reverse power flow, includes a solar cell 11 and a solar cell power conditioner system 12 (hereinafter, a power conditioner system is abbreviated as PCS). The solar cell 11 generates electric power by using sun light and supplies generated electric power to the solar cell PCS 12. The solar cell PCS 12 converts DC power, which is supplied from the solar cell 11, into AC power and supplies the AC power to the power system 85.

The fuel cell system 20, which is a distributed power supply incapable of performing reverse power flow, includes a fuel cell 21 and a fuel cell PCS 22. The fuel cell 21 generates electric power by electrochemical reaction between fuel gas (for example, hydrogen) and oxygen in air and supplies the generated electric power to the fuel cell PCS 22. The fuel cell PCS 22 converts DC power, which is supplied from the fuel cell 21, into AC power and supplies the AC power to the power system 85.

In the embodiment, the solar cell system 10 and the fuel cell system 20 correspond to "distributed power supplies".

The first charge and discharge device 30 includes a first electricity storage 31 and a first charge and discharge PCS 32.

The first electricity storage 31 is configured by combining a plurality of, for example, lithium ion secondary cells and is connected to the power system 85 via a bidirectional inverter.

The first charge and discharge PCS 32 includes a bidirectional inverter for converting DC power from the first electricity storage 31 into AC power and converting AC power from the power system 85 into DC power, the interconnection relay 33, and the stand-alone relay 34. The first charge and discharge PCS 32 has a control function of controlling the bidirectional inverter, the interconnection relay 33, and the stand-alone relay 34.

The interconnection relay 33 connects the first electricity storage 31 and the first line 86 at a time of system interconnection. The stand-alone relay 34 connects the first electricity storage 31 and the second line 87 at the time of self-sustained operation.

The second charge and discharge device 40 includes a second storage 41 and a second charge and discharge PCS 42.

The second storage 41 is configured by combining a plurality of, for example, lithium ion secondary cells and is connected to the power system 85 via a bidirectional inverter.

The second charge and discharge PCS 42 includes a bidirectional inverter for converting DC power from the second storage 41 into AC power and converting AC power from the power system 85 into DC power, the interconnection relay 43, and the stand-alone relay 44. The second charge and discharge PCS 42 has a control function of controlling the bidirectional inverter, the interconnection relay 43, and the stand-alone relay 44.

The interconnection relay 43 connects the second storage 41 and the first line 86 at the system interconnection. The stand-alone relay 44 connects the second storage 41 and the second line 87 at the time of self-sustained operation.

In the embodiment, it is assumed that the first and second charge-and-discharge devices 30 and 40 have a similar configuration.

The switch unit 60 is configured to switch the commercial power source 80 and the power system 85 between electrical connection and disconnection. Concretely, the switch unit 60 is configured to switch between a state where the commercial power source 80 and the first line 86 are connected by connecting contacts "a" and "c" and a state where the first and second lines 86 and 87 are connected by connected a contact "b" and the contact "c". When the first and second lines 86 and 87 are connected, the commercial power source 80 is disconnected from the power system 85.

The commercial power source monitor unit 61 detects electric power of the commercial power source 80 and outputs a detection value to the control unit 70.

The fuel cell monitor 62, the first charge and discharge monitor 63, and the second charge and discharge monitor 64 are provided to the first line 86.

The fuel cell monitor 62 detects the electric power supplied from the fuel cell system 20 to the first line 86 and the electric power of the first line 86. Since the cell fuel system 20 is a distributed power supply incapable of performing reverse power flow, the fuel cell PCS 22 controls the power generation amount of the fuel cell 21 so as not to cause reverse power flow on the basis of the detection value of the fuel cell monitor 62.

The first charge and discharge monitor 63 detects the electric power of the first charge and discharge device 30 and the electric power of the first line 86.

The second charge and discharge monitor 64 detects the electric power of the second charge and discharge device 40 and the electric power of the first line 86.

The control unit 70 includes a microcomputer as a main component and includes a CPU, a ROM, a RAM, an I/O, a bus line connecting those components, and the like (which are not illustrated). The control unit 70 is connected to the first charge and discharge device 30, the second charge and discharge device 40, the commercial power supply monitor 61, and the like. The control unit 70 controls the first and second charge-and-discharge devices 30 and 40 on the basis of an SOC (State Of Charge) as a charge state of the first electricity storage 31, an SOC as a charge state of the second storage 41, a detection result of the commercial power supply monitor 61, and the like.

The control unit 70 checks for the presence/absence of abnormality of the commercial power supply 80 on the basis of the detection value of the commercial power supply monitor 61 and switches the switch unit 60 on the basis of an abnormality check result. When the commercial power supply 80 is normal, the control unit 70 controls the switch unit 60 so that the commercial power supply 80 and the first line 86 are connected. When abnormality in the commercial power supply 80 is detected, the control unit 70 controls the switch unit 60 so that the commercial power supply 80 is detached from the power system 85 and the first and second lines 86 and 87 are connected.

The operation of the electric power supply system 1 when the commercial power supply 80 is normal will be described. When the commercial power supply 80 is normal, the commercial power supply 80 is connected to the power system 85 and supplies electric power to the load 90.

When the solar cell system 10 generates electric power, the generated electric power of the solar cell system 10 is supplied to the load 90, and the forward power flow from the commercial power supply 80 decreases. When the generation power of the solar cell system 10 is larger than the consumption power of the load 90, the storages 31 and 41 is changed with excessive power or the excessive power is allowed to reversely flow to the commercial power supply 80. It may be possible to sell the electric power by the reverse flow of the excessive power to the commercial power supply 80.

When the fuel cell system 20 is generating electric power, the generated electric power of the fuel cell system 20 is supplied to the load 90, and the forward power flow from the commercial power supply 80 decreases. Since the fuel cell system 20 is a distributed power supply incapable of performing reverse power flow, the fuel cell PCS 22 controls the fuel cell system 20 so that a power generation amount is in accordance with the consumption power in the load 90.

The first and second charge-and-discharge devices 30 and 40 are charged or discharged in accordance with the generation power of the solar cell system 10 and the fuel cell system 20 and the consumption power of the load 90. When the consumption power in the load 90 is large, at least one of the first and second charge-and-discharge devices 30 and 40 is discharged and the forward power flow from the commercial power supply 80 can be reduced.

Since the first charge and discharge device 30 cannot perform reverse power flow, the first charge and discharge PCS 32 performs control to reduce an output from the first electricity storage 31 on the basis of a detection value of the first charge and discharge monitor 63 so that reverse power flow does not occur. Similarly, since the second charge and discharge device 40 cannot perform reverse flow power, the second charge and discharge PCS 42 performs control to reduce an output from the second storage 41 on the basis of a detection value of the second charge and discharge monitor 64 so that reverse power flow does not occur.

Next, the operation of the electric power supply system 1 when the commercial power supply 80 is abnormal will be described. In the case abnormality such as blackout, excessive voltage, and excess/insufficiency of the frequency occurs in the commercial power supply 80, the commercial power supply 80 is detached from the power system 85, and the operation of the electric power supply system 1 is switched over to the self-sustained operation. In the embodiment, the stand-alone relay 34 is closed, and a CVCF (Constant Voltage Constant Frequency) operation is performed in which first charge and discharge device 30 outputs the electric power with a predetermined voltage and a constant frequency. As a result, the first charge and discharge device 30 functions as a “simulated system”.

It may be preferable that an output of the constant voltage and constant frequency in the CVCF operation be a small output. In this case, the voltage output from the first charge and discharge device 30 in the CVCF operation can be a sinusoidal voltage with little distortion.

The second charge and discharge device 40 closes the interconnection relay 43 and thereby performs the system interconnection in a manner similar to the case in which the commercial power supply 80 is normal.

Hereinafter, the first charge and discharge device 30 functioning as a simulated system is called a “master device” and the second charge and discharge device 40 performing the system interconnection is called a “slave device” when the commercial power supply 80 is abnormal.

Since the first charge and discharge device 30 acting as a master device has to continue the CVCF operation in order to exhibit the function of the simulated system, the first charge and discharge device 30 has to have a predetermined SOC or higher consistently. In the embodiment, the first electricity storage 31 in the first charge and discharge device 30 is preferentially charged, and the second storage 41 in the second charge and discharge device 40 is preferentially discharged.

In the embodiment, the SOC of the first electricity storage 31 of the first charge and discharge device 30 acting as a master device (also called “SOC of the master device”) is controlled to be in a range between a lower limit value L1 and an upper limit value H1. The SOC of the second storage 41 of the second charge and discharge device 40 acting as a slave device (also called “SOC of the slave device”) is controlled to be in a range between a lower limit value L2 and an upper limit value H2. The lower limit value L1 is set to such a degree that the function of the simulated system can be continued. The lower limit value L2 is set to zero. The upper limit values H1 and H2 are set to values in consideration of a buffer for outputs of the solar cell system 10 and the fuel cell system 20 in a case of sudden change in the consumption power in the load 90.

Technical ideas concerning controlling the first charge and discharge device 30 acting as a master device and the second charge and discharge device 40 acting as a slave device will now be described.

When the electric power generated by the solar cell system 10 and the fuel cell system 20 is smaller than the consumption power in the load 90, the second storage 41 in the second charge and discharge device 40 acting as a slave device is preferentially discharged. When the consumption power in the load 90 cannot be compensated only by the electric power generated by the solar cell system 10 and the fuel cell system 20 and the discharge from the second charge and discharge device 40, the first charge and discharge device 30 discharges the electric power to the load 90 in addition to the discharge for the simulated system function.

When the electric power generated by the solar cell system 10 and the fuel cell system 20 is larger than the consumption power in the load 90, the first electricity storage 31 is preferentially charged by the excessive power. Even when the first charge and discharge device 30 is charging at this time, the first charge and discharge device 30 continues to discharge for the simulated system. When only the charging of the first charge and discharge device 30 is not enough, the second charge and discharge device 40 also charges.

When the SOC of the first electricity storage 31 becomes larger than the upper limit value H1 and the first electricity storage 31 cannot be charged, the second storage 41 is charged by the excessive power. At this time, the discharge amount of the first charge and discharge device 30 is prevented from exceeding the discharge amount for the simulated system. Because of this, the discharged power from the first charge and discharge device 30 is prevented from transferring to the second charge and discharge device 40.

When the SOC of the first electricity storage 31 decreases and becomes smaller than the lower limit value L1, the minimum power to maintain the simulated system function is supplied from the second storage 41 to the first electricity storage 31.

In the embodiment, according to the SOC of the first electricity storage 31 and the SOC of the second storage 41, the charge and discharge of the first and second charge-and-discharge devices 30 and 40 is controlled.

The state check regarding the charge and discharge operation according to the SOC of the first electricity storage 31 and the SOC of the second storage 41 will be described with reference to FIG. 2. In FIG. 2, the case where the charge or discharge cannot be performed is represented by "X" and the case where the charge or discharge can be performed is represented by "○" and "◎". For example, the charge of the master device represented by "◎" means that the master device is preferentially charged although the slave device can be also charged. The same applies to the discharge. Hereinafter, the case where the first and second storages 31 and 41 have to be charged according to the generation power of the solar cell system 10 and the fuel cell system 20 and the consumption power of the load 90 is called "charge request time". The case where the first and second storages 31 and 41 have to be discharged according to the generation power of the solar cell system 10 and the fuel cell system 20 and the consumption power of the load 90 is called "discharge request time". Charging (or discharging) of the first electricity storage 31 is also called "charging (or discharging) of a master device". Charging (or discharging) of the second storage 41 is also called "charging (or discharging) of a slave device".

A state A is a state where the SOC of the master device is zero or more and not more than the lower limit value L1 and the SOC of the slave device is the upper limit value H2 or more. In the state A, the master device is charged at the charge request time and the slave device is discharged at the discharge request time.

A state B is a state where the SOC of the master device is zero or more and not more than the lower limit value L1 and the SOC of the slave device is larger than the lower limit value L2 and smaller than the upper limit value H2. In the state B, the master device is preferentially charged at the charge request time, and the slave device is discharged at the discharge request time.

A state C is a state where the SOC of the master device is 0 or more and not more than L1 and the SOC of the slave device is equal to L2. In the state C, the master device is preferentially charged.

A state D is a state where the SOC of the master device is larger than the lower limit value L1 and smaller than the upper limit value H1 and the SOC of the slave device is the upper limit value H2 or more. In the state D, the master device is charged at the charge request time, and the slave device is preferentially discharged at the discharge request time.

A state E is a state where the SOC of the master device is larger than the lower limit value L1 and smaller than the upper limit value H1 and the SOC of the slave device is larger than the lower limit value L2 and smaller than the upper limit value H2. In the state E, the master device is preferentially charged at the charge request time, and the slave device is preferentially discharged at the discharge request time.

A state F is a state where the SOC of the master device is larger than the lower limit value L1 and smaller than the upper limit value H1 and the SOC of the slave device is equal to the lower limit value L2. In the state F, the master device is preferentially charged at the charge request time and the master device is discharged at the discharge request time.

A state G is a state where the SOC of the master device is equal to or larger than the upper limit value H1 and the SOC of the slave device is equal to or larger than the upper limit value H2. In the state G, the master device is preferentially discharged at the discharge request time.

A state H is a state where the SOC of the master device is equal to or larger than the upper limit value H1 and the SOC of the slave device is larger than the lower limit value L2 and smaller than the upper limit value H2. In the state H, the slave device is charged at the charge request time, and the master device is preferentially discharged.

A state I is state where the SOC of the master device is equal to or larger than the upper limit value H1 and the SOC of the slave device is equal to the lower limit value L2. In the state I, the slave device is charged at the charge request time, and the master device is discharged at the discharge request time.

In the embodiment, the states A to I correspond to "check results".

Figure 3:
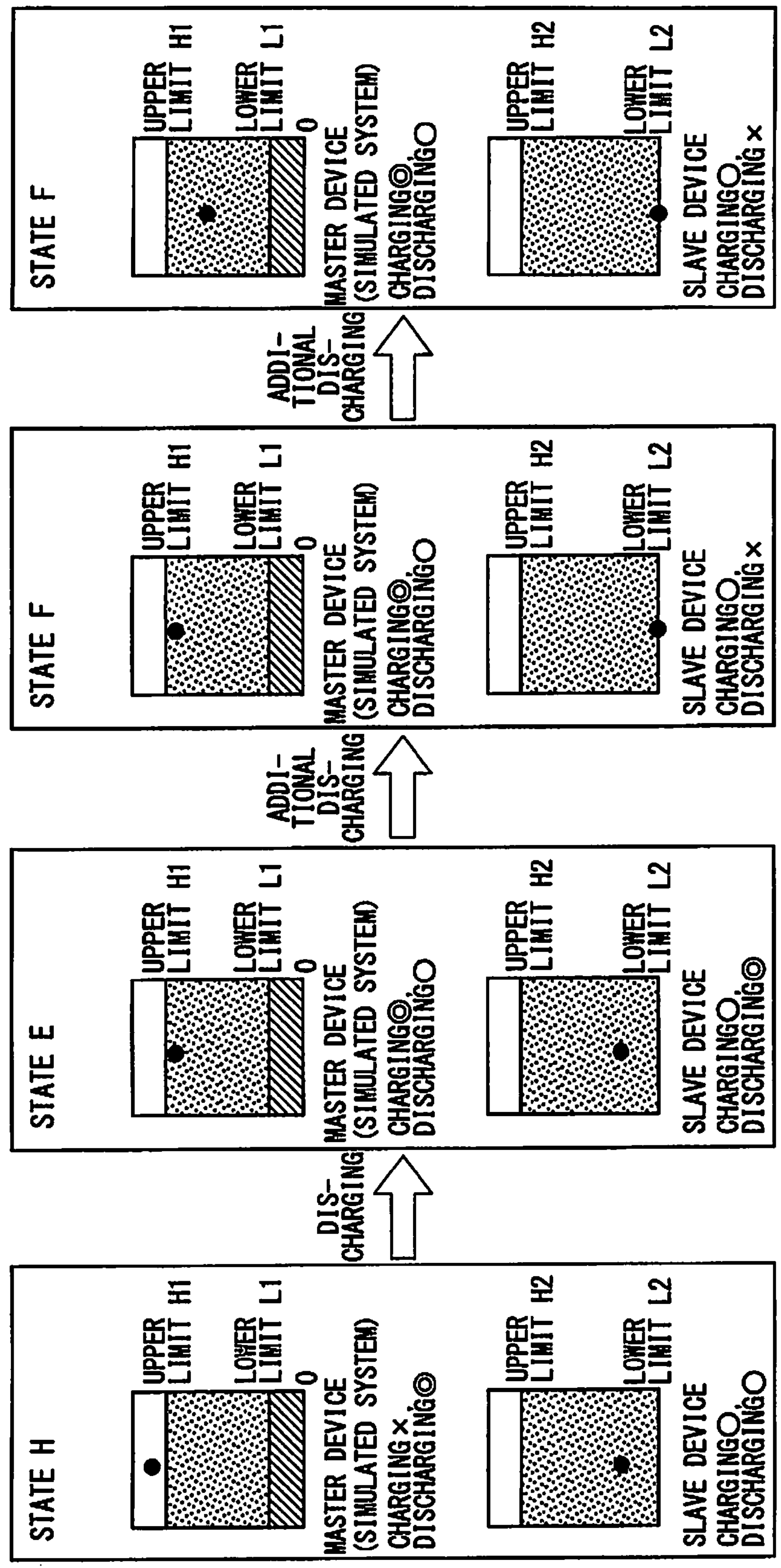
FIG. 3 is an explanatory diagram illustrating the state check at a discharge request time in the first embodiment.

FIG. 3 illustrates an example of the state check at the discharge request time.

As illustrated in FIG. 3, in the state H where the SOC of the master device is equal to or larger than the upper limit value H1 and the SOC of the slave device is larger than the lower limit value L2 and smaller than the upper limit value H2, the master device is preferentially discharged. When the SOC of the master device decreases by the discharge of the master device and becomes the state E where the SOC is smaller than the upper limit value H1, the slave device is preferentially discharged. When the SOC of the slave device decreases by the discharge of the slave device and becomes the state F where the SOC is equal to the lower limit value L2, the slave device cannot be discharged anymore, so that the master device is discharged (refer to the second state F from the right end in FIG. 3). When the master device is discharged, the SOC of the master device decreases (refer to the state F at the right end of FIG. 3).

FIG. 4 illustrates an example of th state check at the charge request time.

As illustrated in FIG. 4, in the state F where the SOC of the master device is larger than the lower limit value L1 and smaller than the upper limit value H1 and the SOC of the slave device is equal to the lower limit value L2, the master device is preferentially charged. When the SOC of the master device increases by charging of the master device and becomes the state I where the SOC is the upper limit value H1, the master device cannot be charged anymore, so that the slave device is charged. When the slave device is charged, the SOC of the slave device increases (refer to the two states H in FIG. 4).

As described above, in the embodiment, according to the SOC of the master device and the SOC of the slave device, the charge and discharge state is switched over.

The solar light power generation in cloudy weather or the like may lead to unstable generation of the electric power in the solar cell system 10 and the fuel cell system 20. There may be a frequently change in consumption power of the load 90, for example, a washing machine.

Figure 5A:
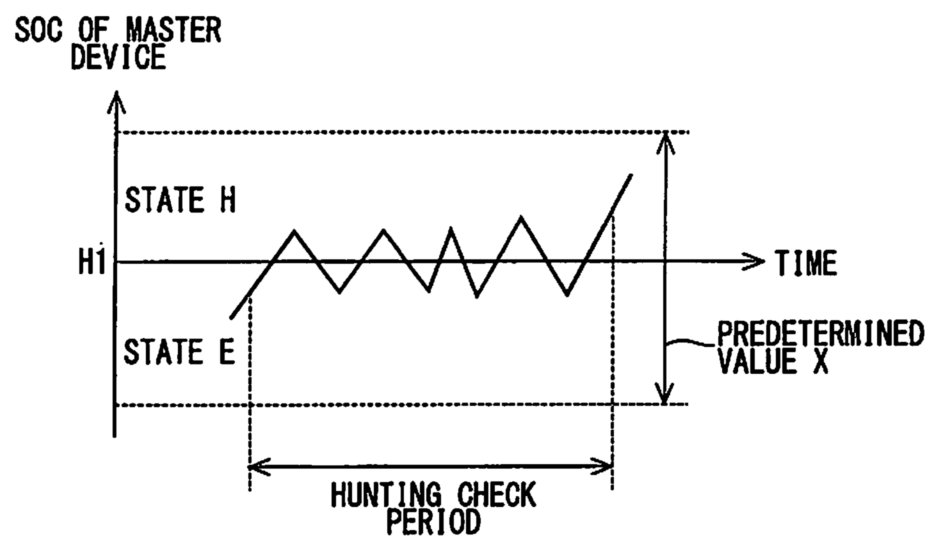
FIG. 5A is an explanatory diagram illustrating a state transition when generation power or consumption power is unstable in the first embodiment.
Figure 5B:
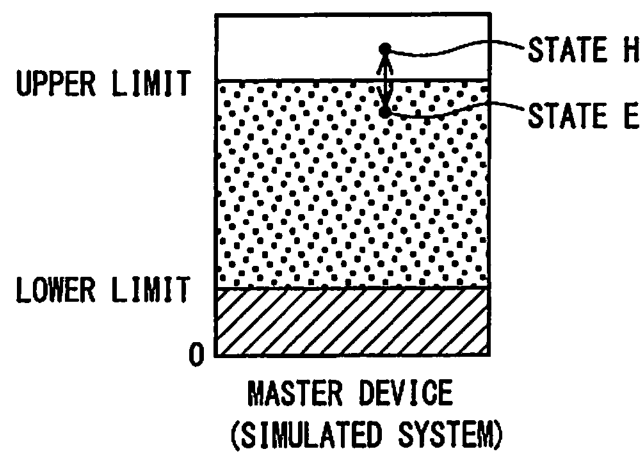
FIG. 5B is an explanatory diagram illustrating a hunting of switching between a state E and a state H when generation power or consumption power is unstable in the first embodiment.

As illustrated in FIG. 5A, when the generation power or consumption power is unstable when the SOC of the master device is around the upper limit value H1, the SOC may repeatedly exceed or fall below the upper limit value H1. In such a situation, when it is assumed that, for example, the SOC of the slave device is larger than the lower limit value L2 and smaller than the upper limit value H2, a short check cycle causes a hunting, which is frequent switching between the states E and H, as illustrated in FIG. 5B. The same occurs when the SOC of the master device is around the lower limit value L1 and the case that the SOC of the slave device is around the upper limit value H2 or the lower limit value L2. Hereinafter, the upper limit value H1 and the lower limit value L1 regarding the state check off the SOC of the master device will be called a "check threshold of the master device" and the upper limit value H2 and the lower limit value L2 regarding the state check of the SOC of the slave device will be called a "check threshold of the slave device".

Figure 6:
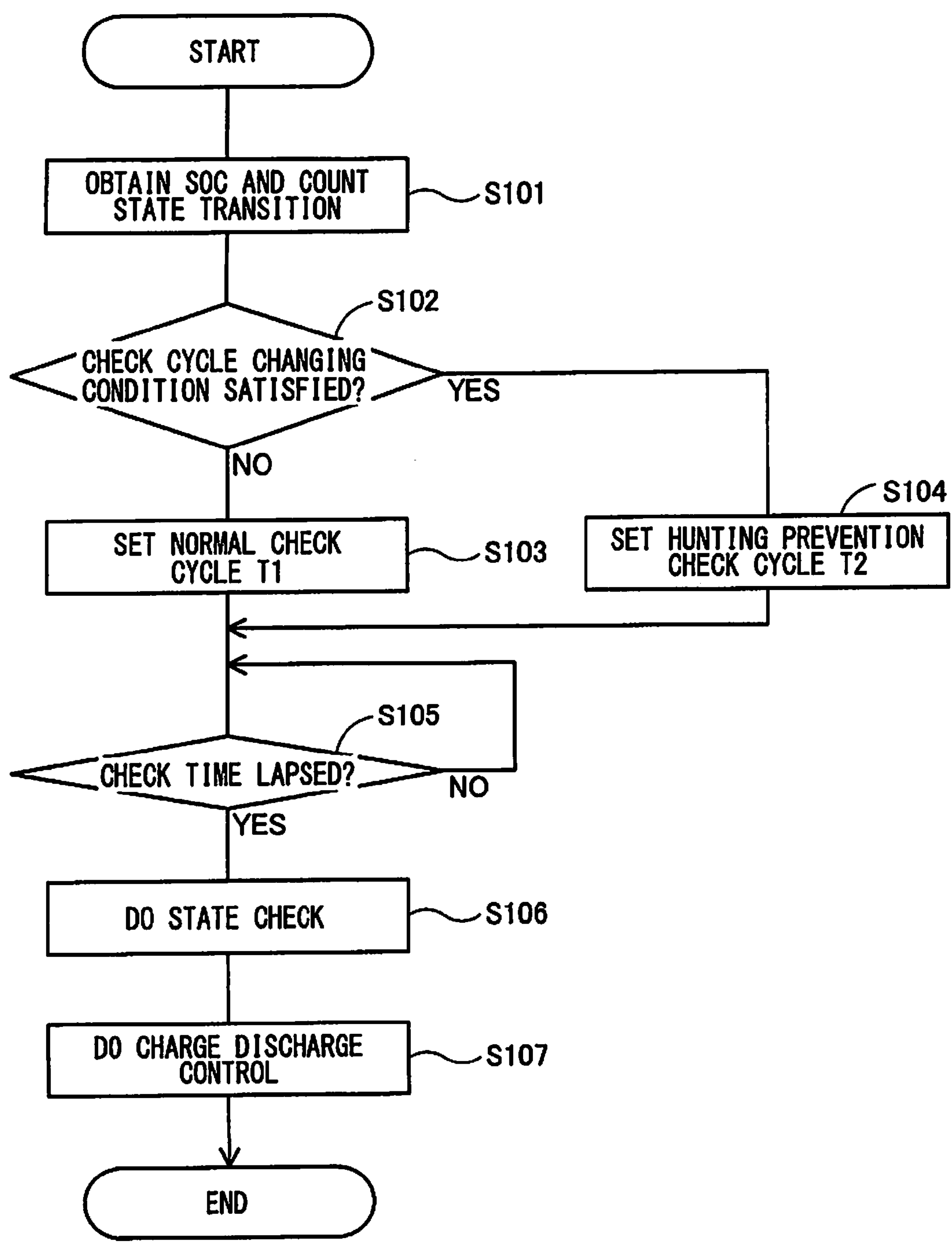
FIG. 6 is a flowchart illustrating a state checking process in the first embodiment.

In the embodiment, the check cycle is changed to prevent the hunting. A state checking process in the embodiment will be described with reference to the flowchart illustrated in FIG. 6. The state checking process illustrated in FIG. 6 is executed by the control unit 70 during the self-sustained operation.

In the first step S101 (hereinafter, "step" will not be described but indicated only by the character "S"), the SOC of the master device and the SOC of the slave device in a hunting check period are obtained. The hunting check period is set to a below-described normal check period T1. However, the hunting check period may be set to a value different from the normal check period T1.

It is assumed that the SOC of the master device is obtained in a below-described SOC monitor process and is stored in a storage (not shown) of the control unit 70. In this case, on the basis of the SOC in the hunting check period, the number of state transitions in the check period is counted. The "number of state transitions" means the number of times the SOC of the master device traverses the check threshold of the master device and does not accompany switching of the state/discharge states.

The same applies to the SOC of the slave device and the number of state transitions is counted.

In S102, whether a change condition for changing a check cycle is satisfied or not is determined. In the embodiment, the change condition is determined as satisfied when the number of state transitions of the SOC of the master device in the hunting check period is a predetermined number of times more and the change amount of the SOC of the master device in the hunting check period is a predetermined number X or less. The change amount of the SOC is obtained by subtracting the minimum value from the maximum value of the SOC in the hunting check period. The same applies to the SOC of the slave device. The predetermined value of the change amount of the SOC is such a value that the occurrence of hunting is recognized. The predetermined value of the change amount of the SOC may be different among the upper limit values H1 and H2 and the lower limit values L1 and L2, or the same.

In the embodiment, the hunting check period corresponds to a "predetermined period".

When it is determined that the change condition for changing the check cycle is satisfied (S102: YES), the process proceeds to S104. When it is determined that the change condition for changing the check cycle is not satisfied (S102: NO), the process proceeds to S103.

In S103, the check cycle is set to the normal check cycle T1.

In S104, the check cycle is set to the hunting prevention check cycle T2 longer than the normal check cycle T1.

In S105, it is determined whether a check time has elapsed after the previous state check. The check time is a time based on the check cycle set in S103 or S104. When it is determined that the check time has not elapsed (S105: NO), this determination is repeated. When it is determined that the check time has lapsed (S105: YES), the process proceeds to S106.

In S106, the state check based on the most recently obtained SOCs of the master device and the slave device is performed (refer to FIG. 2).

In S107, the charge and discharge of the slave device and the master device is controlled according to a check result in S106 and a charge/discharge request. When the generation power in the solar cell system 10 and the fuel cell system 20 is larger than the consumption power in the load 90 and the check result is the state B, C, E, or F (refer to FIG. 2), the charging of the first electricity storage 31, which is to be preferentially charged, may not enough depending on the excessive power. In this case, the charging is performed also in the second storage 41.

When the consumption power in the load 90 is larger than generation power in the solar cell system 10 and the fuel cell system 20 and the check result is the state D or E, the discharging of the second storage 41, which is to be preferentially discharged, may not lead to power shortage. In this case, the discharging is performed also in the first electricity storage 31. Similarly, when the consumption power in the load 90 is larger than the generation power in the solar cell system 10 and the fuel cell system 20 and the check result is the state G or H, the discharging of the second storage 41, which is to be preferentially discharged, may not lead to power shortage. In this case, the discharging is performed also in the second storage 41.

Figure 7A:
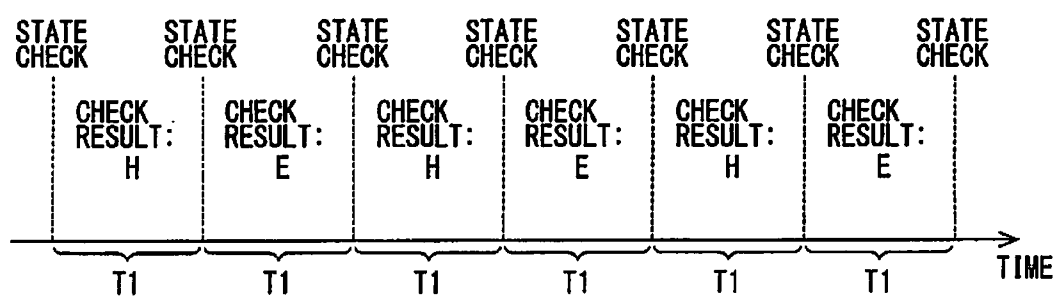
FIG. 7A is an explanatory diagram illustrating a hunting.

As illustrated in FIG. 7A, for example, when the SOC of the master device is around the upper limit value H1 and at least one of the power generation and consumption power is unstable and the check cycle is set to the normal check cycle T1, the hunching may occur and the state may frequently switches between the states H and E.

Figure 7B:
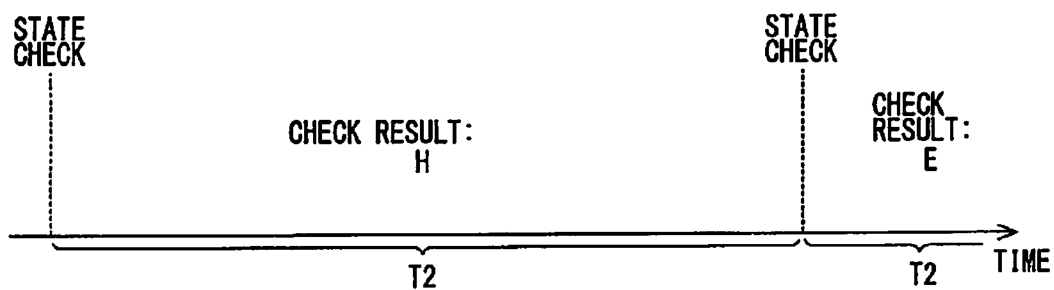
FIG. 7B is an explanatory diagram illustrating a hunting prevention check cycle in the state checking process in the first embodiment.

In the embodiment, when the change condition for changing the check cycle is satisfied (S102 in FIG. 6: YES), as illustrated in FIG. 7B, the check cycle is set as the hunting prevention check cycle T2 longer than the normal check cycle T1, so that hunting can be suppressed.

In the embodiment, the SOC of the master device and the SOC of the slave device are monitored. In the above, the monitoring cycle is deceased in a region where the hunting may occur and the monitoring cycle is increased in the other region to lessen the memory load.

The SOC monitoring process will be described with reference to the flowchart illustrated in FIG. 8. The SOC monitoring process is executed by the control unit 70 during the self-sustained operation.

In S201, it is determined whether a monitor cycle change condition is satisfied or not. In the above, when the SOC of the master device obtained in the previous calculation lies in a monitor cycle change range including the upper limit value H1 or lower limit value L1 or when the SOC of the slave device lies in a monitor cycle change range including the upper limit value H2 or the lower limit value L2, it is determined that the monitor cycle change condition is satisfied. The monitor cycle change range related to the upper limit value H1 and the monitor cycle change range related to the upper limit value H2 may be the same or different. Similarly, the ranges related to the lower limit values L1 and L2 may be the same or different. The monitor cycle change ranges are set to ranges in which the hunting may occur.

When it is determined that the monitor cycle change condition is satisfied (S201: YES), the process proceeds to S203. When it is determined that the monitor cycle change condition is not satisfied (S201: NO), the process proceeds to S202.

In S202, the monitor cycle is set to a normal monitor cycle M1.

In S203, the monitor cycle is set to a monitor enhancement cycle M2 shorter than the normal monitor cycle M1.

In S204, it is determined whether or not a monitor time has elapsed since the previous SOC obtaining. The monitor time is a time based on the monitor cycle set in S202 or S203. When it is determined that the monitor time has not elapsed (S204: NO), the determining process is repeated. When it is determined that the monitor time has elapsed (S204: YES), the process proceeds to S205.

In S205, the SOC of the master device and the SOC of the slave device are obtained and stored in a storage (not shown).

As described above specifically, the electric power supply system 1 includes the solar cell system 10 and the fuel cell system 20 acting as distributed power supplies, the charge and discharge devices 30 and 40, the switch unit 60, and the control unit 70.

The solar cell system 10 and the fuel cell system 20 can supply electric power to the power system 85 which is also supplied with electric power from the commercial power supply 80 and which can supply power to the load 90.

The first charge and discharge device 30 includes the first electricity storage 31, which can be charged/discharged, and can perform the system interconnection of performing a charging and discharging operation on the power system 85. Similarly, the second charge and discharge device 40 includes the second storage 41, which can be charged/discharged, and can perform the system interconnection of performing a charging and discharging operation on the power system 85. When an abnormality occurs in the commercial power supply 80, at least one of the charge and discharge devices 30 and 40 can perform a simulated system operation of supplying the electric power with a constant power and a constant frequency to the power system 85.

The switch unit 60 connects the commercial power supply 80 to the power system 85 when the commercial power supply 80 is normal, and disconnects the commercial power supply 80 from the power system 85 when the commercial power supply 80 is abnormal.

The control unit 70 controls the first and second charge-and-discharge devices 30 and 40.

Figure 8:
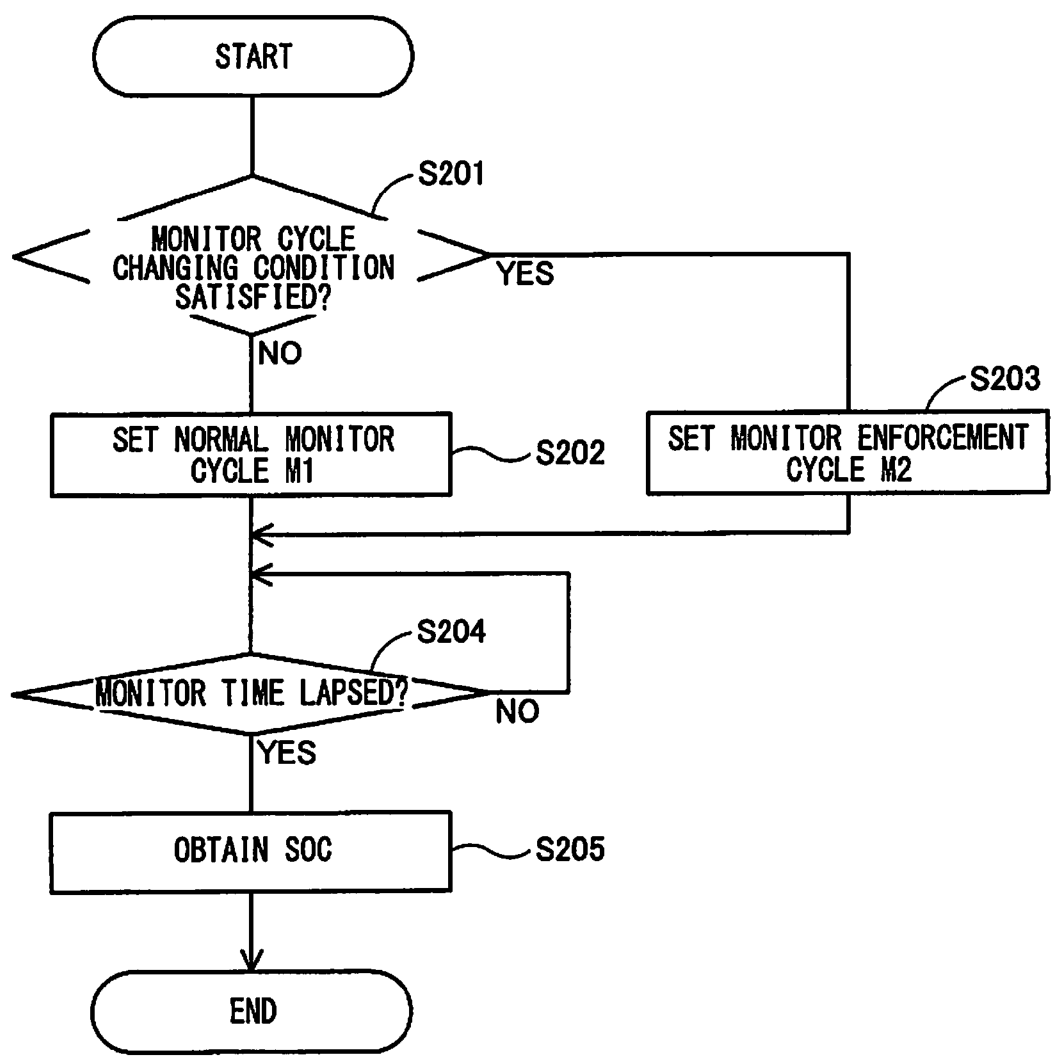
FIG. 8 is a flowchart illustrating an SOC monitoring process in the first embodiment.

The control unit 70 obtains the SOC of the storages 31 and 41 (S205 in FIG. 8). When the abnormality occurs in the commercial power supply 80, the control unit 70 performs a state check based on the SOC (S106 in FIG. 6). According to the result of the SOC-based state check, the electric power supplied from the solar cell system 10 and the fuel cell system 20, and the consumption power in the load 90, the control unit 70 can charge and discharge the plurality of storages 31 and 41 at the same time or preferentially charges the first electricity storage 31 of the first charge and discharge device 30 performing the simulated system operation and preferentially discharges the second storage 41 of the second charge and discharge device 40 performing the system interconnection (S107).

In the embodiment, at least one of the charge and discharge devices 30 and 40 can perform the simulated system operation. Consequently, even when the abnormality occurs in the commercial power supply 80, the electric power can be stably supplied from the electric power supply system 1 to the load 90.

By controlling the plurality of charge and discharge devices 30 and 40 in liaison with each other in accordance with the result of the SOC-based state check, the power supplied from the solar cell system 10 and the fuel cell system 20, and consumption power in the load 90, it is possible to assure a sufficient charge amount and a sufficient discharge amount.

Further, by preferentially charging the first electricity storage 31 of the first charge and discharge device 30 acting as a master device and preferentially discharging the second storage 41 of the second charge and discharge device 40 acting as a slave device, it is possible to stably continue the simulated system function in the master device and it is also possible to perform proper discharging according to the consumption power in the load 90.

When the number of state transitions, which is the number of times the SOC of the storages 31 and 41 traverses the state check threshold related to the state check is equal to or larger than the predetermined number of times and a change amount of the SOC in the hunting check period is equal to or less than a predetermined value, the control unit 70 sets the check cycle of the state check to a value longer than the normal check cycle (S104).

In this way, the hunting, which is the frequent switching between the charge and discharge of the storages 31 and 41, can be suppressed.

When the SOC is within the monitor cycle change range including the state check threshold, the control unit 70 sets a SOC obtaining cycle to be shorter than a normal SOC obtaining cycle (S203).

Consequently, by decreasing the SOC obtaining cycle in the monitor cycle change range in which hunting may occur, it is possible to properly control the charge and discharge state of the first and second charge and discharge devices 30 and 40. By increasing the SOC obtaining cycle in a region in which there is no possibility of hunting, it is possible to reduce the memory load in the control unit 70.

In the embodiment, the control unit 70 serves as "charge state obtaining means (section)", "state checking means (section)", "check cycle changing means (section)", and "obtain cycle changing means (section)". S205 in FIG. 6 or 8 corresponds to a process associated with a function of "charge state obtaining means (section)". S106 corresponds to a process as a function of "state checking means (section)". S107 corresponds to a process associated with a function of "charge and discharge control means (section)". S104 corresponds to a process associated with a function of "check cycle changing means (section)". S203 corresponds to a process associated with a function of "obtain cycle changing means (section)".

Second Embodiment

Figure 9:
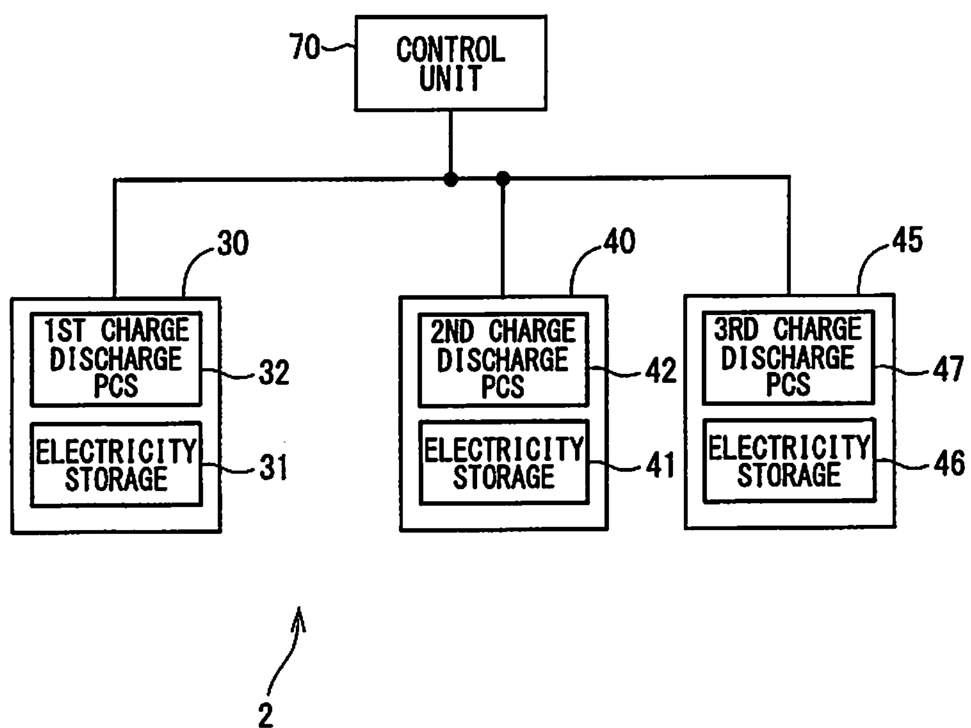
FIG. 9 is a block diagram illustrating an electric power supply system according to a second embodiment.
Figure 10:
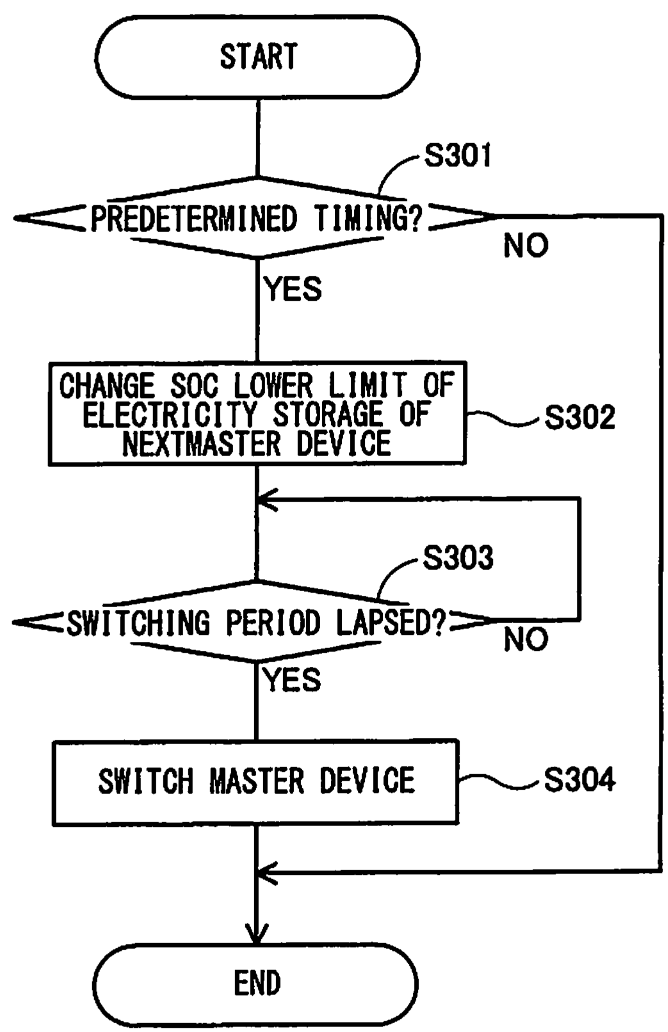
FIG. 10 is a flowchart illustrating a master device switching process in the second embodiment.

A power supply system according to a second embodiment is illustrated in FIGS. 9 and 10.

As illustrated in FIG. 9, an electric power supply system 2 of the embodiment is different from the foregoing embodiment in that it includes a third charge and discharge device 45 in addition to the first and second charge and discharge devices 30 and 40. The solar cell system 10, the fuel cell system 20, the power system 85, and the like are similar to those in the foregoing embodiment, so that they are not illustrated in FIG. 9. They are also not illustrated also in FIG. 11 which will be described later.

The third charge and discharge device 45 includes a third storage 46 and a third charge and discharge PCS 47. The third charge and discharge PCS 47 is similar to the first charge and discharge PCS 32 and the second charge and discharge PCS 42.

In the foregoing embodiment, the first charge and discharge device 30 functions as a master device, and the second charge and discharge device 40 functions as a slave device. In the second embodiment, one of the first, second, and third charge and discharge devices 30, 40, and 45 is set as a master device, and the remaining two devices are set as slave devices. When a plurality of slave devices exist, the ratio of the total power storage amount to the total chargeable amount of the plurality of slave devices is regarded as the SOC of the slave devices as a whole, and the state check is performed in a manner similar to the foregoing embodiment.

In the second embodiment, the charge and discharge devices become a master device in turn. As in the first embodiment, two charge and discharge devices may become a master device in turn. Since the master device is charged preferentially, deterioration of the storage occurs faster as compared with the slave device. Consequently, a switch over of a master device between the charge and discharge devices can reduce a variation in deterioration among the storages 31, 41, and 46.

In the embodiment, when a predetermined switching period has elapsed, one of the charge and discharge devices that have been used as slave devices is set as a master device, and the charge and discharge device that has been used as a master device is set as a slave device. In the embodiment, the lower limit value of the SOC of the master device is set to a first lower-limit value L11, and the lower limit value of the SOC of the slave device is set to a second lower-limit value L12. The first lower-limit value L11 is similar to the lower limit value L1 in the foregoing embodiment, and the second lower-limit value L12 is similar to the lower limit value L2 in the foregoing embodiment.

A master device switch process will now be described on the basis of the flowchart illustrated in FIG. 10. The process is executed at predetermined intervals by the control unit 70 during the self-sustained operation.

In S301, it is determined whether it becomes a predetermined timing which is earlier than a master device switching timing or not. The "predetermined timing which is earlier than a master device switching timing" is set according to a time required to change the SOC of the storage of the slave which will function as the master device after the switching from the second lower-limit value L12 to the first lower-limit value L11. When it is determined that it is not the predetermined timing which is earlier than the master device switching timing (S301: NO), the subsequent processes are not performed. When it is determined that it becomes the predetermined timing which is earlier than the master device switching timing (S301: YES), the process proceeds to S302.

In S302, the lower limit value of the SOC of the storage of the device which becomes the master device after the switching is changed from the second lower-limit value L12 to the first lower-limit value L11.

In S303, it is determined whether the switch period has elapsed or not is determined. When it is determined that the switch period has not elapsed (S303: NO), the determining process is repeated. When it is determined that the switch period has elapsed (S303: YES), the process proceeds to S304.

In S304, the master device is switched over. The lower limit value of the SOC of the storage of the device which switches over from the master device to the slave device is changed from the first lower-limit value L11 to the second lower-limit value L12.

In the embodiment, the plurality of charge and discharge devices 30, 40, and 45 can perform the simulated system operation.

Every switching period, the control unit 70 switches over the charge and discharge device 30, 40, and 45 performing the simulated system operation (S304). This switching can reduce a deterioration variation among the storages 31, 41, and 46.

The lower limit value of the SOC of the master device is set as the first lower-limit value L11, and the lower limit value of the SOC of the slave device is set as the second lower-limit value L12.

At the predetermined timing earlier than the switching timing of switching over the charge and discharge device performing the simulated system operation, the lower limit value of the SOC of the storage of the charge and discharge device that will perform the simulated system operation after the switching is changed from the second lower-limit value L12 to the first lower-limit value L11 by the control unit 70 (S302).

By the operation, the charge and discharge device performing the simulated system operation can be properly switched over.

In the embodiment, the control unit 70 serves as, in addition to the means (sections) of the foregoing embodiment, "switching means (section)" and "lower-limit-value changing means (section). S304 in FIG. 10 corresponds to a process associated with a function of "switching means (unit)". S302 corresponds to a process associated with a function of "lower-limit-value changing means (section)".

Other Embodiments (1) State Checking Process

In the foregoing embodiment, when the check cycle changing condition is satisfied, the check cycle is changed. In other embodiments, the check cycle may be set to be constant and may not be changed. That is, the processes in S101 to S104 in FIG. 6 may be omitted.

(2) SOC Monitoring Process

In the foregoing embodiment, when the monitor cycle changing condition is satisfied, the monitor cycle is changed. In another embodiment, the monitor cycle may be constant and may not be changed. That is, S201 to S203 in FIG. 8 may be omitted.

(3) Master Device Switching Process

In the second embodiment, when the predetermined period has elapsed, the master device is switched over. In another embodiment, when the number of times the master device switches over between charging and discharging reaches a predetermined number, the master device may be switched over. When the lower limit value of the SOC of the master device and that of the SOC of the slave device are set to the same, the lower-limit-value changing process may not be performed. That is, S301 and S302 in FIG. 10 may be omitted.

(4) Charge and Discharge Device

In the foregoing embodiment, one charge and discharge device is set as the master device, and the other charge and discharge devices are set as the slave devices. In another embodiment, a plurality of master devices may be set, and the number of slave devices may be three or more.

Figure 11:
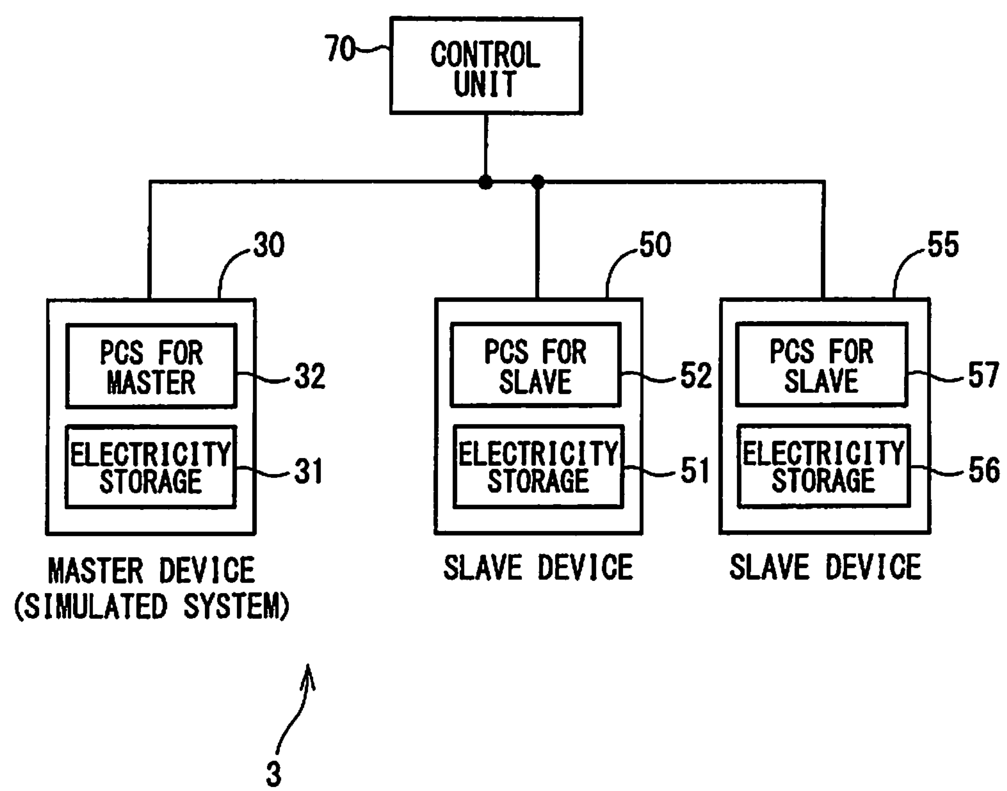
FIG. 11 is a block diagram illustrating an electric power supply system according to another embodiment.

When the first charge and discharge device is set as the master device and the second charge and discharge device is set as the slave device and the master device is not switched over as in the first embodiment, a configuration such as the stand-alone relay for making the second charge and discharge device function as a master device may be omitted from the second charge and discharge PCS. Specifically, as illustrated in FIG. 11, a charge and discharge device 50 in an electric power supply system 3 includes a storage 51 and a PCS 52 for slave. A charge and discharge device 55 includes a storage 56 and a PCS 57 for slave. The PCSs 52 and 57 for slave may not include a configuration such as a stand-alone relay for making the charge and discharge devices function as master devices.

Consequently, the charge and discharge device used as a slave device can be simplified. For example, when it is difficult to replace the storage of a part of charge and discharge devices due to an installation state of the charge and discharge device and the like, the charge and discharge device including a replaceable storage may be used as the master device and deteriorated concentratedly.

In FIG. 11, for illustration purpose, the first charge and discharge PCS 32 in the first charge and discharge device 30 provided with a configuration for functions of a master device is expressed as "PCS for master".

By physically replacing installation of the PCS for master, the storage used as the master device may be switched. With the configuration, a variation in deterioration among the storages can be reduced.

Although the storage is a secondary cell in the foregoing embodiments, the storage may be any device as long as it can be charged/discharged such as, for example, an electric double-layer capacitor or the like.

(5) Distributed Power Supply

In the foregoing embodiments, the electric power supply systems include the solar cell system and the fuel cell system as distributed power supplies. In another embodiment, one of the solar cell system and the fuel cell system may be omitted. As long as electric power can be supplied to the power system, the distributed power supply is not limited to the solar cell system and the fuel cell system but may be any system such as a wind power generation system, a small-scaled hydroelectric power generation system, or the like.

(6) Control Unit

In the embodiment, the control unit, which is a higher rank unit and is outside of the charge and discharge devices, functions as "charge state obtaining means (section)", "state checking means (section)", "charge and discharge control means (section)", "check cycle changing means (section)", "obtain cycle changing means (section)", "switching means (section)", and "lower-limit value changing means (section)". In another embodiment, part or all of the means (sections) may be provided by a PCS of a charge and discharge device.

In the embodiment, when the SOC is around the upper limit value or the lower limit value, the check cycle is set longer than a normal check cycle to prevent the hunting. In another embodiment, a dead zone including the upper limit value and the lower limit value of the SOC may be set to prevent the switching of the charge and discharge state in the dead zone. Such a configuration may prevent the hunting in which switching of the charge and discharge states frequently occurs.

Although the embodiments and the configurations of the present disclosure have been illustrated above, embodiments and configurations of the present disclosure are not limited to the respective embodiments and configurations illustrated above. Embodiments and configurations obtained by properly combining technical elements disclosed in different embodiments and configurations may be also included in the scope of the embodiments and configurations of the present disclosure.

The invention claimed is:

1. An electric power supply system comprising:

a distributed power supply capable of supplying electric power to a power system that is also supplied with electric power from a commercial power supply and is capable of supplying electric power to a load;

a plurality of charge and discharge devices each including a chargeable and dischargeable electricity storage and capable of performing a system interconnection of performing a charging and discharging operation on the power system;

a switch device for connecting the commercial power supply to the power system when the commercial power supply is normal, and for disconnecting the commercial power supply from the power system when the commercial power supply has an abnormality; and a control unit for controlling the charge and discharge devices, wherein at least one of the plurality of charge and discharge devices is capable of performing a simulated system operation of supplying the electric power with a constant power and a constant frequency to the power system when the abnormality occurs in the commercial power supply, the control unit including:

a charge state obtaining section for obtaining states of charge of the electricity storages;

a state checking section for performing a state check based on the states of charge of the electricity storages when the abnormality occurs in the commercial power supply; and a charge and discharge control section capable of simultaneously charging and discharging the electricity storages of the plurality of charge and discharge devices in accordance with a check result of the state checking section, the electric power supplied from the distributed power supply, and consumption power in the load, wherein the charge and discharge control section preferentially charges the electricity storage of the charge and discharge device performing the simulated system operation and preferentially discharges the electricity storage of the charge and discharge device performing the system interconnection.

2. The electric power supply system according to claim 1, wherein at least two of the charge and discharge devices are each capable of performing the simulated system operation, and the control unit further includes a switch section for, every switch period, switching over the charge and discharge device performing the simulated system operation.

3. The electric power supply system according to claim 2, wherein a lower limit value related to the state of charge of the electricity storage of the charge and discharge device performing the simulated system operation is set as a first lower limit value and a lower limit value related to the state of charge of the electricity storage of the charge and discharge device performing the system interconnection is set to a second lower limit value smaller than the first lower limit value, the control unit further includes a lower-limit-value changing section, at a predetermined timing before a switching timing of switching over the charge and discharge device performing the simulated system operation, the lower limit value related to the state of charge of the electricity storage of the charge and discharge device that performs the simulated system operation after the switching over is changed from the second lower limit value to the first lower limit value by the lower-limit-value changing section.

4. The electric power supply system according to claim 1, wherein the control unit further includes a check cycle changing section, the check cycle changing section sets a check cycle of the state check to be longer than a normal check cycle when the number of state transitions, which is the number of times the state of charge of the electricity storage traverses a state check threshold related to the state check in a predetermined period, is equal to or greater than a predetermined number of times and a change amount of the state of charge of the electricity storage in the predetermined period is equal to or less than a predetermined value.

5. The electric power supply system according to claim 4, wherein the control unit further includes an obtain cycle changing section for setting an obtain cycle, which is a cycle of obtaining the state of charge of the electricity storage, to be shorter than a normal obtain cycle when the state of charge of the electricity storage is within a monitor cycle changing range including the state check threshold.

* * * * *